F. H. CATHCART.
SHAFT COUPLING.
APPLICATION FILED DEC. 24, 1908.
1,055,606.
Patented Mar. 11, 1913.
2 SHEETS—SHEET 2.
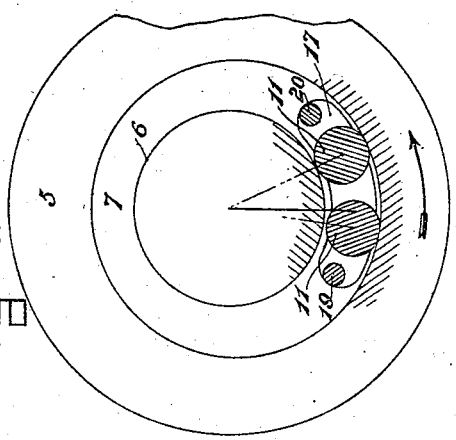
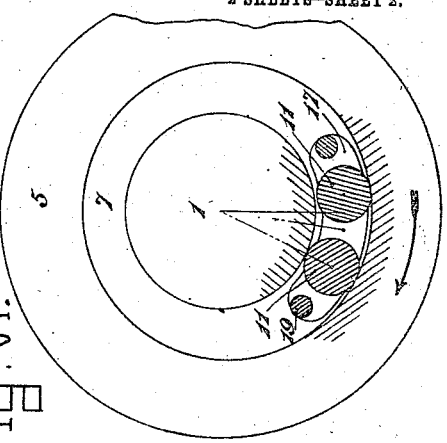

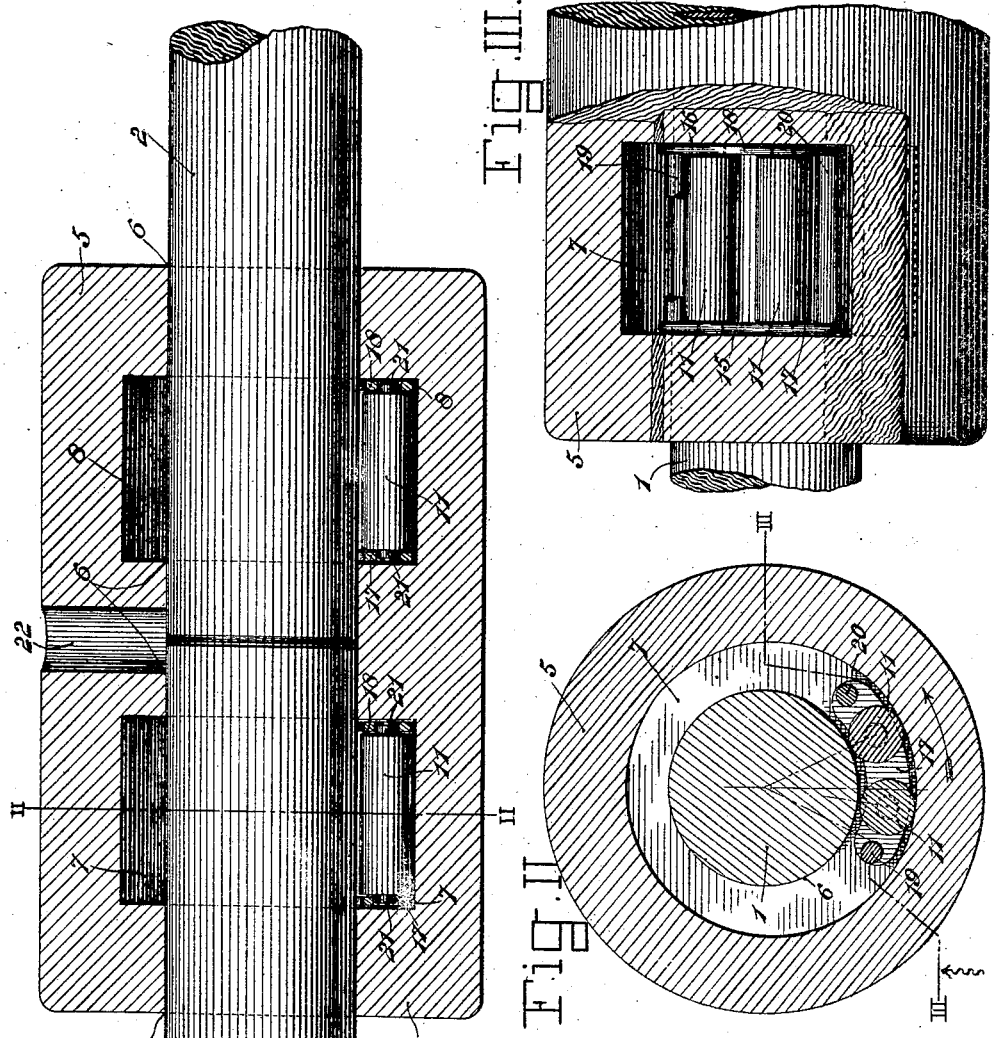

UNITED STATES PATENT OFFICE.

FRANK H. CATHCART, OF TRENTON, NEW JERSEY.

SHAFT-COUPLING.

1,055,606.   Specification of Letters Patent.   Patented Mar. 11, 1913.

Application filed December 24, 1908. Serial No. 469,148.

*To all whom it may concern:*

Be it known that I, FRANK H. CATHCART, of Trenton, in the county of Mercer, State of New Jersey, have invented certain new and useful Improvements in Shaft-Couplings and the Like, of which the following is a specification.

My invention relates to means for operatively uniting abutting ends of shafts and particularly sections of line shafting.

The advantage, theoretically, of means for effecting, at will, connection or disconnection between one section of shafting and another is well recognized in the art, but great practical difficulty has been experienced in producing a simple, reliable, economical, and effective coupling, one which may be readily adjusted into and out of service at any time, and which, when adjusted to service, may be depended upon to insure and preserve unimpaired the alinement of the shafting to which it is applied.

By my invention I produce a shaft coupling of the kind described, which, harmonizing theory and practice, combines the greatest strength and highest efficiency with compactness and lightness of structure, and all at a gain, in the art, of economy in manufacture.

With these and other objects in view, the invention consists in certain novel features of construction and combinations and arrangements of parts as will be more fully hereinafter described and pointed out in the claim.

In the accompanying drawings: Figure I shows my device complete in its preferred form of embodiment and as applied in service, the shell of the device being shown in diametrical longitudinal section and the abutting shaft sections and other portions shown in elevation. Fig. II is a section on the line II—II of Fig. I. Fig. III is a side elevation of a part of my device, a portion of the same being broken away for the purpose of better illustration. Fig. IV is a perspective view of the roller spacing and alining frame with the rollers in place therein. Fig. V is a diagrammatic view illustrating my invention showing the rollers at one end of their throw and Fig. VI is a similar view showing the rollers at the other end of their throw.

1 and 2 indicate abutting shafts, such, for example, as sections of line shafting, which when properly mounted or hung, have their longitudinal axes in accurate alinement. The shaft-sections 1 and 2 are illustrated as representative of any two mechanical elements such as my coupling is adapted operatively to unite so as to admit of their connection or disconnection at will.

My coupling comprises a shell 5 whose longitudinal and transverse dimensions are determinable by the work it is required to do and, ordinarily, by reference to the diameter of the shaft-sections which it is the office of my coupling to unite. The shell 5 is provided with a preferably coaxial bore 6, which snugly fits shafting of the size for which it is intended, represented in the drawings by the shaft-sections 1 and 2. The accurate alinement of the shaft-sections being preserved by their admission to the bore, I provide within the shell 5, adjacent respectively to that end of each shaft-section which enters the bore 6, two cylindrical chambers 7 and 8, whose axes are slightly eccentric to the axis of the bore 6, one chamber being provided for each shaft-section. The shell 5 being reversible end for end, the chambers 7 and 8 are substantially identical in construction and in their relationship, respectively, to the shaft-sections, and for that reason reference herein to either chamber is equally applicable to both.

The measure of eccentricity of the chamber with reference to the bore 6, which is to say, in other words, with reference to the shaft-sections which enter the bore, constitutes a distinctive feature of my invention, as will be presently hereinafter explained. Within each chamber, I provide a plurality of rollers, indicated in the various figures by the reference numeral 11. The roller which I prefer to employ is preferably a true cylinder whose diameter is such as to admit of its accommodation within the chamber 7 or 8 along with the proper shaft-section in such manner as to permit operative movement or throw of the roller within the chamber about said shaft-section, due to the eccentricity of the chamber with respect to the shaft which it surrounds.

It will appear from the foregoing that if the shell be rotated in either direction, the rollers 11 will, at a certain point, engage the opposing walls of the chamber and the shaft, which opposing walls define upon two sides the space within which the rollers 11 work. In consequence of such engagement, the shaft and shell will become united, and their union will continue so long as the direction of rotation between the shaft and shell is relatively maintained. If, on the contrary, the direction of rotation be changed, as by the manual operation of the shell upon a dead shaft, the interruption of the travel of the shell upon a coupled shaft, or the reversal of movement of one shaft-section in opposition to the direction of movement in the other shaft-section, the engagement between the rollers and the opposing walls of the chambers and the shaft will be broken, and the rollers thus released will travel to the opposite end of its throw until again, but at another point, it engages the opposing walls of the chamber and shaft, and operatively unites them. The throw of the rollers, that is to say, the length of its travel from one point of engagement to the other, or, in other words, from their point of engagement with the shaft on one side of the chamber to their point of engagement with the shaft on the other side of the chamber, is determinable by the relative size of the rollers and the distance of separation between the centers of the bore 6 and of the chambers 7 or 8.

The diameter of the roller, upon which the efficiency of the coupling largely depends, should be such as to insure between the roller, on the one hand, and on the other, the opposing walls of the shaft and the chamber, certainty and promptitude of engagement without excessive or bursting strain upon the shell, or crushing strain upon the roller.

The means of preserving the parallelism between the axes of the rollers and the bore 6 is shown in the drawings. It is the preferred means for the purpose, because of the fact that the means under consideration performs the additional function of spacing a pair of rollers as well as of positively alining them. The spacing of the two rollers prevents contact between a functioning roller and an idler, where two rollers are employed, and consequently diminishes the throw of the rollers to the extent of the space which separates the rollers. The preferred means under consideration consists of a spacing and alining frame wherein the rollers are properly mounted and which travels with the rollers in their throw within the coupling chamber.

The frame preferably consists of a pair of cheek-plates 17 and 18 having a curvature substantially correspondent to that of the chamber in which they work. The cheek-plates are connected to opposite ends by transverse spacing-rods 19 and 20. The space between the rods 19 and 20 is sufficient to accommodate the rollers 11 at a proper distance apart, and to that end the said rollers are provided at opposite ends with journals 21 that work in suitable bearings provided for them, respectively, in the opposing cheek-plates. It is observable that the ends of the cheek-plates which carry the rods and which project beyond the rollers on opposite sides are of smaller width than the diameter of the rollers, and that consequently they are free to work within the chamber without the least contact with the wall of the chamber, on the one hand, or with the shaft-sections on the other.

The material of which my coupling is made may be of any kind suitable for the purpose, that preferred for ordinary uses being steel, whereof the bearing parts may be, as required, suitably hardened to any extent that may appear to be desirable.

In the middle part of the shell 5, I provide a radial aperture 22 (see Fig. I) which penetrates the shell from its exterior to its bore. It affords means of engagement with the coupling of an instrument for turning it, and also renders the interior of the coupling visible, thereby facilitating the adjusting of the coupling midwise upon abutting shaft-sections. Other means for operating the coupling may be employed, but the aperture 22 is preferred because it serves two purposes and both equally well.

Having described my invention what I claim is,—

A shaft coupling provided with concentric bores and eccentric chambers, in combination with shafts passing through such concentric bores and eccentric chambers, and a roller-locking device in each eccentric chamber between the shaft end and the surface of the chamber, such roller locking device consisting of a frame provided with a plurality of rollers.

In testimony whereof I have hereunto signed my name in the presence of two subscribing witnesses.

FRANK H. CATHCART.

Witnesses:
 JAMES F. A. PHILLIPS,
 B. M. PHILLIPS.